United States Patent
Tarjan (10) Patent No.: US 8,504,910 B2
(45) Date of Patent: Aug. 6, 2013

(54) MAPPING A THIRD-PARTY WEB PAGE TO AN OBJECT IN A SOCIAL NETWORKING SYSTEM

(75) Inventor: Paul Tarjan, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 53 days.

(21) Appl. No.: 12/986,858

(22) Filed: Jan. 7, 2011

(65) Prior Publication Data
US 2012/0179958 A1   Jul. 12, 2012

(51) Int. Cl.
*G06F 15/16* (2006.01)

(52) U.S. Cl.
USPC ............ 715/234; 715/203; 715/236; 715/239

(58) Field of Classification Search
USPC .................. 715/200, 201, 203, 234, 236, 239
See application file for complete search history.

(56) References Cited

U.S. PATENT DOCUMENTS

| | | | |
|---|---|---|---|
| 7,955,175 B1 * | 6/2011 | Holloway et al. ............... | 463/42 |
| 7,958,193 B2 * | 6/2011 | Augustine et al. ............. | 709/205 |
| 2005/0125408 A1 * | 6/2005 | Somaroo et al. ................ | 707/10 |
| 2006/0271620 A1 * | 11/2006 | Beaty et al. .................... | 709/203 |
| 2007/0150537 A1 * | 6/2007 | Graham ........................ | 709/203 |
| 2008/0021870 A1 * | 1/2008 | Birnbaum et al. ................ | 707/3 |
| 2008/0034040 A1 * | 2/2008 | Wherry et al. ................ | 709/204 |
| 2008/0040426 A1 * | 2/2008 | Synstelien et al. ............ | 709/203 |
| 2008/0091771 A1 * | 4/2008 | Allen et al. .................... | 709/203 |
| 2008/0288582 A1 * | 11/2008 | Pousti et al. ................... | 709/203 |
| 2009/0049525 A1 | 2/2009 | D'Angelo et al. | |
| 2009/0070412 A1 * | 3/2009 | D'Angelo et al. ............. | 709/203 |
| 2009/0182589 A1 | 7/2009 | Kendall et al. | |
| 2010/0332330 A1 | 12/2010 | Goel et al. | |

OTHER PUBLICATIONS

PCT International Search Report and Written Opinion, PCT Application No. PCT/US2012/020377, Apr. 25, 2012, eight pages.

\* cited by examiner

*Primary Examiner* — Stephen Hong
*Assistant Examiner* — Gregory J Vaughn
(74) *Attorney, Agent, or Firm* — Fenwick & West LLP (57) ABSTRACT

A social networking system includes a mechanism for customizing display of content from an external web page. Nodes associated with a web page are included in the social graph based on one or more tags included in a web page, which contain meta-information for defining the node in the social networking system, such as the type of the node. The social networking system retrieves the tags from the markup language document and stores their information in connection with the node for the web page while using the tags to identify a template that describes display of content from the web page. The template may include user interface elements for receiving input, allowing a user to interact with a node in the social graph associated with the web page, allowing user interactions with the web page content to be tracked by and reflected back within the social networking system.

29 Claims, 3 Drawing Sheets

MAPPING A THIRD-PARTY WEB PAGE TO AN OBJECT IN A SOCIAL NETWORKING SYSTEM

BACKGROUND

This invention relates generally to social networking, and in particular to a social networking environment in which web pages outside of a social networking system are presented within the social networking system, where users can interact with the web pages as objects within the social networking system.

Social networking systems have become prevalent in recent years because they provide a useful environment in which users can connect to and communicate with other users. Although a variety of different types of social networking systems exist, these systems commonly provide mechanisms allowing users to define and interact within their social networks. In this context, a user may be an individual or any other entity, such as a business or other non-person entity. Accordingly, while enabling social communications among friends, a social networking system can also be a valuable tool for businesses to engage with potential consumers. Even without a commercial purpose, a social networking system may allow other types of entities to spread their message. For example, a non-person entity may set up a page or group that other users can join (or become a "fan" of), which enables the non-person entity to provide a forum to receive and transmit communications to a group of interested users.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node.

For example, if one user establishes a connection with another user in the social networking system, the two users are represented as a node, and the edge between them represents the established connection. Continuing this example, one of these users may send a message to the other user within the social networking system. This act of sending the message is another edge between those two nodes, which can be tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the attendance of the event is the edge. Using a social graph, therefore, a social networking system may keep track of many different types of objects and the interactions and connections among those objects, thereby maintaining an extremely rich store of socially relevant information.

One limitation of a social networking system's ability to track socially relevant information is the ability to represent different objects and to track any interactions among them. This problem can be appreciated in the context of the discussion of the social graph. If something is not represented by a node in the first place, then other nodes cannot interact with it such that the social networking system can track an edge between those nodes. For example, if it were desirable to track whether a user purchased a product outside of the social networking system, the information necessary to track that product as a node would have to be provided to the social networking system. However, there is no efficient mechanism to provide this information so that it can be used effectively by the social networking system. Accordingly, what are needed are mechanisms to facilitate expansion of the social graph to allow a social networking system to track socially relevant information for a wide variety of things and allow interaction with content from various sources using the social graph.

SUMMARY

Embodiments of the present invention provide a flexible mechanism to allow user interaction with content from a web page associated with a third-party web site or presentation of data from a web page associated with a third-party web site using format determined by the social networking system. In particular, embodiments of the invention enable the social networking system to obtain data from the web page and convert it to a format for presentation within the social networking system. In one example, the social networking system selects a template for the web page, and the content from the web page is mapped to the selected template and then hosted by the social networking system, allowing the social networking system to display content from the web page using a format specified by the template. Additionally, the template may provide functionality allowing a user to interact with the content from the web page and cause a corresponding action to occur within the social networking system. Thus, content external to the social networking system may be presented in a format associated with the social networking system and users may interact with the social networking system via the template based on content from the web page.

In one embodiment, a web page is associated with a node in a social networking system. The web page is encoded by a markup language document, which a web browser application can use to render and display the web page on a user device. The markup language document includes one or more tags, which contain meta-information about the node. The tags may provide textual titles, labels, an identifier unique to the node, a micro format, and/or descriptions about the node, as well as other information, such as the type of the node. The social networking system retrieves the tags from the markup language document and stores their information in connection with the node for the web page. In this way, a node in the social networking system may be created and defined based on the information contained within a web page. The tags may also be used to identify a type associated with the node or to identify one or more types of interactions with the node in the social networking system. Using the tags and additional content in the markup language document, the social networking system associates a template stored by the social networking system with the web page. The social networking system then displays content from the web page using a format described by the template. In one embodiment, the template includes functionality, such as action buttons, allowing a user to interact with the node associated with the web page. The actions action may depend on the type of node, such as becoming a fan of or liking a fan page node, joining a group or interest associated with the node, submitting a review associated with the node, connecting with the node, sharing the node with another user, confirming attendance to an event node, checking in to a location node, commenting on a media item node, just to name a few examples.

Accordingly, embodiments of the invention allow users of the social networking system to interact with content from web pages external to the social networking system from within the social networking system. This also enables users to view content from a web page in a format that facilitates interaction with the content using additional functionalities provided by the social networking system. Finally, as a benefit to the external websites, the users' interactions with a web page's content from within the social networking system may be communicated back to the external website, which may then use the resulting socially relevant information for various purposes (e.g., posting activity feeds, targeting advertising, etc.).

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
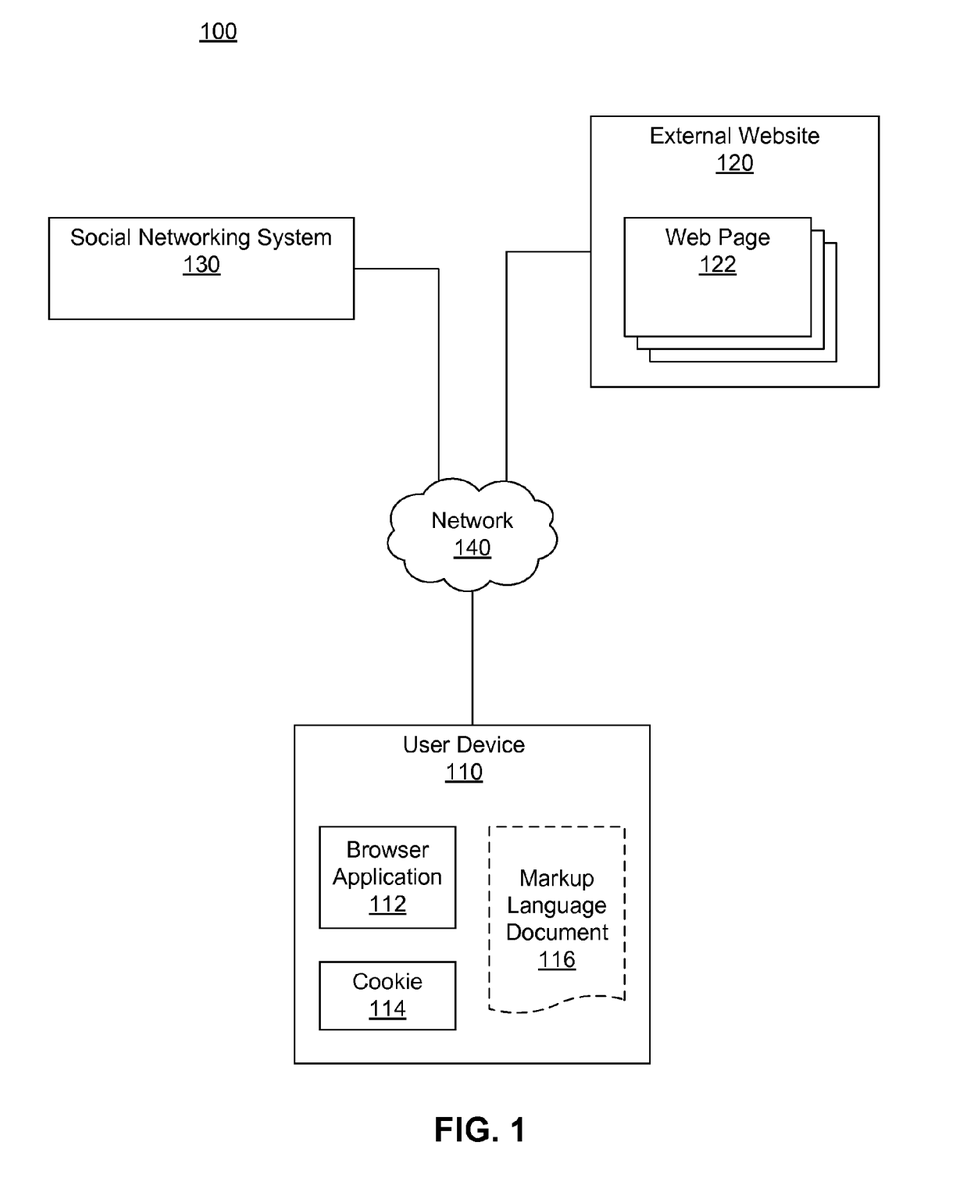
FIG. 1 is a network diagram of a system for providing personalized content to a user of a social networking system, in accordance with an embodiment of the invention.

FIG. 1 is a network diagram of one embodiment of a system 100 for providing personalized content to a user of a social networking system 130. The system 100 includes one or more user devices 110, one or more external websites 120, and the social networking system 130, as well as a network 140 enabling these systems to communicate. For purposes of illustration, the embodiment of the system 100 shown by FIG. 1 includes a single external website 120 and a single user device 110. However, in other embodiments, the system 100 may include more user devices 110 and/or more external websites 120. In certain embodiments, the social networking system 130 is operated by the social network provider, whereas the external websites 120 are separate from the social networking system 130 in that they may be operated by different entities. In various embodiments, however, the social networking system 130 and the external websites 120 operate in conjunction to provide social networking services to users of the social networking system 130. In this sense, the social networking system 130 provides a platform, or backbone, which other systems like external website 120 may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the external website 120 and the social networking system 130 via the network 140, which may comprise any combination of local area and/or wide area networks, using both wired and wireless communication systems.

In one embodiment, the user device 110 displays content from the external website 120 or from the social networking system 130 by processing a markup language document 116 received from the external website 120 or from the social networking system 130 using a browser application 120. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having multiple frames that include text and/or image data retrieved from the external website 120 and/or the social networking system 130. In various embodiments, the markup language document 116 comprises a data file including extensible markup language (XML) data, extensible hypertext markup language (XHTML) data or other markup language data.

In one embodiment, the user device 110 also includes a cookie 114 that contains data indicating whether a user of the user device 110 is logged into the social networking system 130. The cookie 114 may indicate whether the user of the computing device 110 is involved in an active session where the user device 110 exchanges data with the social networking system 130, thereby allowing modification of the data communicated from the social networking system 130 to the user device 110.

The external website 120 comprises one or more web servers that include one or more web pages 122, which may be communicated to the user device 110 via the network 140. The external website 120 is separate from the social networking system 130. For example, the external website 120 is associated with a first domain while the social networking website is associated with a separate social networking domain. A web page 122 included in the external website 120 comprises a markup language document identifying content and including instructions specifying formatting or presentation of the identified content, as described above.

The markup language document 116 includes one or more tags including meta-information associating the web page 122 represented by the markup language document 116 with a node in the social networking system 130, as described in more detail below. The tags allow creation of a node in the social networking system 130 based on the information within the markup language document 116 comprising a web page 122. As the web page 122 may be maintained by an external website 120 that is outside of the domain of the social networking system 130 and may be operated by an entity other than an operator of the social networking system 130, the tags in the markup language document 116 allow external websites 120 to define, create, and maintain nodes used by the social networking system 130, as further described below.

The social networking system 130 comprises one or more computing devices storing a social network, or a social graph, which comprises a plurality of users. The social networking system 130 provides its users with the ability to communicate and interact with other users of the social network. The social networking system 130 is further described below in conjunction with FIG. 2. In use, users join the social networking system 130 and then add connections to a number of other users of the social networking system 130 to whom they desire to be connected. As used herein, the term "friend"

refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in an external website 120, separate from the social networking system 130, coupled to the social networking system 130 via a network 140.

The social networking system 130 is also capable of linking a variety of entities. For example, the social networking system 130 enables users to interact with each other as well as external websites 120 or other entities, using APIs and/or other communication channels. As explained above, the social networking system 130 generates and maintains a "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the social networking system 130. An edge between two nodes in the social graph represents a particular kind of connection between the two nodes, which may result from an action that was performed by one of the nodes on the other node. For example, when a first user identifies a second user as a friend, an edge in the social graph is generated connecting a node representing the first user and a second node representing the second user. As various nodes interact with each other, the social networking system 130 modifies edges connecting the various nodes to reflect the interactions.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
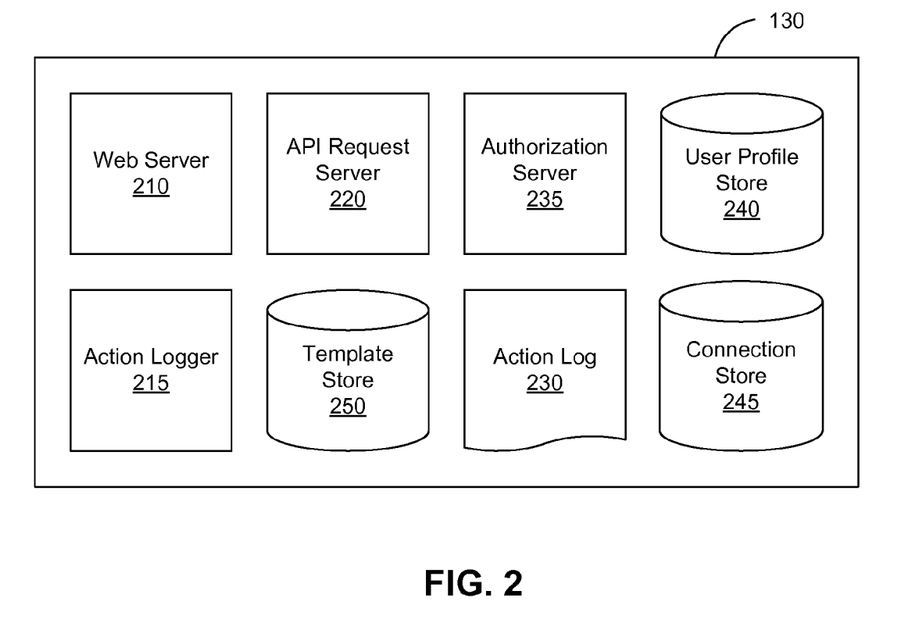
FIG. 2 is a diagram of a social networking system, in accordance with an embodiment of the invention.

FIG. 2 is a diagram of one embodiment of a social networking system 130. The embodiment of a social networking website 130 shown by FIG. 2 includes a web server 210, an action logger 215, an API request server 220, an action log 230, a user profile store 240, a connection store 245 and a template store 250. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network. The user profiles include biographic, demographic, and other types of descriptive information, such as work experience, educational history, hobbies or preferences, location, and the like. The social networking system 130 further stores data describing one or more connections between different users in the connection store 245. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more user device 110 and/or one or more external websites 130 via the network 240. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more external websites 120 to access information from the social networking system 130 by calling one or more APIs. The API request server 220 may also allow external websites 120 to send information to social networking website by calling APIs. For example, an external website 120 sends an API request to the social networking system 130 via the network 140 and the API request server 220 receives the API request. The API request server 220 processes the request by calling an API associated with the API request to generate an appropriate response, which the API request server 220 communicates to the external website 120 via the network 140. For example, responsive to an API request, the API request server 220 collects data associated with a user and communicates the collected data to the external website 120. For example, if the social networking system 130 displays content from the external website 120 using a template, the API request server 220 may capture data identifying users interacting with the content from the external website 120. The API request server 220 may communicate the captured data, or a subset of the captured data, to the external website 120 to provide data about user interaction with the content.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 240. In one embodiment, the social networking system maintains the action log 230 as a database of entries. When an action is taken within the social networking system 130, an entry for the action is added to the action log 230.

Additionally, user actions may be associated with an entity outside of the social networking system 130, such as an external website 120 that is separate from the social networking system 130. For example, the action logger 215 receives data describing a user's interaction with an external website 120 from the web server 210. Examples of actions where a user interacts with an external website 120, or an object associated therewith, include a user expressing an interest in an external website 120 or another entity, a user posting a comment to the social networking system 130 that discusses an external website 120 or a web page 122 within the external website 120, a user posting to the social networking system 130 a Uniform Resource Locator (URL) or other identifier associated with an external website 120, a user attending an event associated with an external website 120, or any other action by a user that is related to an external website 120 or an object associated therewith. Thus, the action log 240 may include actions describing interactions between a social networking system 130 user and an external website 120 that is separate from the social networking system 130.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, a privacy setting may identify specific information to be shared with other users. As another example, a privacy setting identifies a work phone number or a specific set of related information, such as, personal information including profile photo, home phone number, and status. Alternatively, a privacy setting may apply to all the information associated with the user. The specification of the set of entities that can access particular information can also be specified at various levels of granularity. Various sets of entities with which information can be shared may include, for example, all friends of the user, all friends of friends, all applications, all external websites 120 or all external systems. One embodiment allows the specification of the set of entries comprise an enumeration of entities, for example, the user may provide a list of external websites 120 that are allowed to access certain information. Another embodiment allows the specification to comprise a set of entities along with exceptions that are not allowed to access the information. For example, a user may allow all external websites 120 to access the user's work information but specify a list of external websites 120 that are not allowed to access the work information. Certain embodiments call the list of exceptions that are not allowed to access certain information a block list. External systems, such as external websites 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

For example, a user's privacy setting indicates that a first friend is allowed to access the user's work phone number and the user's mobile phone number while preventing the first friend from accessing other information about the user, such as the user's profile photo or the user's list of friends. However, the user's privacy setting indicates that a second friend is allowed to access the user's friend list. The information associated with a user includes actions taken by a user such as the action of adding a new friend. The user 130 can completely block another user or an application from accessing any information associated with the user 130. A user or an application that is blocked by the user 130 does not have access to any information associated with user 130.

The authorization server 235 contains logic to determine if certain information associated with a user can be accessed by a user's friends, external websites 120 and/or other applications and entities. For example, an external website 120 that attempts to access a user's comment about a URL associated with the external website 120 must get authorization from the authorization server 235 to access the user's work phone number. Based on the user's privacy settings, the authorization server 235 determines if another user, an external website 120, an application or another entity is allowed to access information associated with the user, including information about actions taken by the user. For example, the authorization server 235 uses a users privacy setting to determine if the user's comment about a URL associated with the external website 120 can be accessed by the external website 120. This enables a user's privacy setting to specify which other users, or other entities, are allowed to receive data about the user's actions or other data associated with the user.

Additionally, the social networking system 130 maintains data about objects with which a user may interact with using the social networking system 130. To maintain this data, the user profile store 240 and the connection store 245 store instances of the corresponding type of objects maintained by the social networking system 130. Each object type has information fields that are suitable for storing information appropriate to the type of object. For example, the user profile store 240 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user. In one embodiment, the object type may be used to identify a template from the template store 250 used to display content received from a web page 122 from an external website 120. For example, an event template may be used to display content from a web page 122 associated with an object that is an event (e.g., a concert).

The connection store 245 includes data structures suitable for describing a user's connections to other users, connections to external websites 120, or connections to other entities. The connection stores 245 may also associate a connection type with a user's connections, which may be used in conjunction with the user's privacy setting, further described above, to regulate access to information about the user. Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from the user profile store 240 may act as nodes in the social graph. The connection between the first user and the second user stored by the connection store 245 is an edge between the nodes associated with the first user and the second user. Continuing this example, the second user man then send the first user a message within the social networking system 130, which is identified by the action logger 215 and stored in the action log 230. The stored action of sending the message is another edge between the two nodes in the social graph representing the first user and the second user. Additionally, the message itself may be identified from the action log 230 and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 240, where the attendance of the event is an edge between the nodes that may be retrieved from the action log 230. By generating and maintaining the social graph, the social networking system 130 includes data describing many different types of objects and the interactions and connections among those objects, providing a rich source of socially relevant information.

The template store 250 includes data structures describing formats for displaying data, such as content from an external website. For example, the template store 250 includes a plurality of markup language documents including one or more instructions describing formatting or presentation of content. One or more template markup language documents may be associated with an object type, so that content from a web page 122 is displayed using a template markup language document determined from the type associated with the content from the web page 122. For example, tags included in a markup language document 116 describing the web page 122 allow the social networking system 130 to associate an object type with the web page 122 and select a template markup language document from the object type. The selected template markup language document is communicated to a user device 110, where a browser application 112 displays content using the format or presentation described by the selected template markup language document. For example, the template markup language document includes instructions for generating and displaying a web page having multiple frames that include text and/or image data retrieved from the external website 120 and/or the social networking system 130. The template markup language may also include instructions for generating and displaying one or more action buttons or other user interface elements for receiving and communicating an action and/or associated data from a user to the social networking system 130. In various embodiments, the template markup language documents comprise data files including extensible markup language (XML) data, extensible hypertext markup language (XHTML) data or other markup language data.

Structure and Content of a Web Page of an External Website

Referring again to FIG. 1, a web page 122 of an external website 120 includes a includes content, such as text data, video data, image data, or any other data for presentation using a browser application 122 operating on a user device 110. The web page 122 also includes one or more instructions describing formatting or presentation of the content. When a browser application 122 operating on a user device 110, executes the instructions included in the web page 122, the browser application 112 displays the identified content using the format or presentation described by the web page 122.

In one embodiment, the web page 122 comprises a markup language document 116 that includes the content and the instructions for formatting or presenting the content. In various embodiments, the markup language document 116 comprises a data file including extensible markup language (XML) data, extensible hypertext markup language (XHTML) data, or other markup language data. In addition to the content and instructions for formatting or presenting the content, the markup language document 116 comprising the web page 122 also includes one or more tags that include meta-information about a node in the social graph maintained by the social networking system associated with the web page 122. The tags may provide textual titles, labels, and/or descriptions about the node, as well as other information, such as a title, label, unique identifier, microformat, and/or descriptions about the node, as well as other information, such as the type of the node. The social networking system 130 retrieves the tags from the markup language document 116 and stores their information in connection with the node for the web page 122. The tags allow the social networking system 130 to create and define a node in a social graph based on the information contained within the web page 116. Because the web page 122 may be outside of a domain of the social networking system 130 and may be operated by an entity other than the social networking system 130 operator, the tags enable third parties to define, create, and maintain nodes that are then used by the social networking system 130.

Examples of information about the node provided by one or more tags included in the markup language document 116 encoding the web page 122 may include, without limitation, a title, label, unique identifier, microformat, descriptions about the node, the type of the node, a location associated with the node, start and end times associated with the node, action links, contact information, and one or more social networking system user identifiers specifying one or more administrators of the node. A title tag identifies a text string to be shown when the social networking system 130. Similarly, a keyword tag includes text information identifying one or more keywords identifying the web page 122 and/or a description tag comprises text information describing the web page 122 that is displayed by the social networking system 122 when the node is presented. An image tag may identify an image displayed by the social networking system 122 when the node is presented. Additionally, a canonical tag identifies a canonical uniform resource locator (URL), or other web identifier, which identifies the web page 122.

An administrator tag includes one or more social networking system 130 user identifiers specifying users of the social networking system 130 with the ability to create and/or maintain nodes associated with the web page 122. The administrator tag potentially allows users outside of the social networking system 130 to create and maintain nodes used by the social networking system 130, effectively opening the social graph to third-party developers and encourages further development and definition of a complex and rich social graph. In one embodiment, the social networking system 130 provides a user interface to the user identifiers specified by the administrator tag, which facilitates modification of the node associated with the web page 122. Similarly, an administrator may programmatically maintain nodes and perform actions in the social networking system 130 without an actual user's interaction.

One or more microformat tags attach semantics to other markup tags included in the markup language document 116, which allows information identified by the markup tags to be automatically processed by the social networking system 130. The microformat tags allow data describing the node in the social networking system 130, or describing the object represented by the node in the social networking system 130, to be standardized. Additionally, one or more microformat tags may increase the information the social networking system 130 obtains from the web page 122 to more particularly identify a node type or to associate a type with a node. For example, the additional information obtained from the web page 122 using a microformat tag may allow the social networking system 130 to use data from the web page 122 to learn more about the interests of social networking system 130 users connected to the node associated with the web page 122. Similarly, a location tag provides information about a location associated with the web page 122 to the social networking system 130. For example, a location tag identifies one or more addresses associated with an event, such as a concert. Likewise, start and end time tags provide information about times for an object (such as an event) associated with the node.

A node type tag identifies a type of node created by the social networking website 130 and associated with the web page 122. As the social networking system 130 enables different actions to be performed on different types of nodes, the node type tag allows customization of how social networking system 130 users interact with the node associated with the web page 130. In one embodiment, the node type tag includes one or more values selected from a list maintained by the social networking system 130. For example, the node type tag may include a value identifying a user, a non-person entities, a content item, a group, an event, a message, a concept, a sports team, a blog, an activity, a web site, a movie, a musician, a hotel, a university, a government organization, a restaurant, a company, an landmark, a bar, a location or any other thing that can be represented by an object in the social networking system 130. The node type tag may be used to determine or specify allowable interactions between users and the node in the social networking system 130. The microformat tags may be used to determine action buttons, or other user interface elements, displayed in addition to the web page content in a template selected by the social networking system 130.

In one embodiment, multiple node type tags are included in the web page 122, or a node type tag includes multiple values, so that the social networking system 130 generates different types of nodes associated with the web page 122. For example, a web page 122 identifying a marathon may include node type tags identifying an event, a non-person entity and a location. This causes the social networking system 130 to generate three different nodes, a first node having an event type, a second node having a non-person entity type and a third node having a location type, each associated with the web page 122; the social networking system 130 enables users to perform different actions on each node, depending on the type of the node, as further described below. Additionally, the social networking system 130 may associate different templates from the template store 250 with the different types of nodes, allowing content from the web page 122 to be displayed by the social networking system 130 in different formats. Alternatively, the social networking system 130 generates a single node having properties of different types of node. In the previous example, rather than generate a node having an event type, a node having a non-person entity type and a node having a location type, a single node may be generated having the properties of a node having an event type, a node having a non-person entity type and a node having a location type is generated.

Presentation of Content Retrieved from a Web Page Outside of a Social Networking System In one embodiment, the social networking system 130 identifies a node associated with the URL or other web identifier and determines a template used to display the web page content. The template and web page content are combined to form a page within the social networking system 130, which may be communicated from the social networking system 130 to the browser application 112. The browser application 112 renders the combined page based on instructions in the received template, which allows the external web page's content to be displayed by the browser application 112 using a format determined by the social networking system 130. This combined page from the social networking system 130 may also include an interface that allows the user to perform social actions with respect to a node associated with the external web page, where those actions have an effect within the social networking system 130. For example, if the external web page is related to a concert, the social networking system 130 may combine that content with an event template, which enables users of the social networking system 130 to confirm attendance of an event node associated with that concert.

Figure 3:
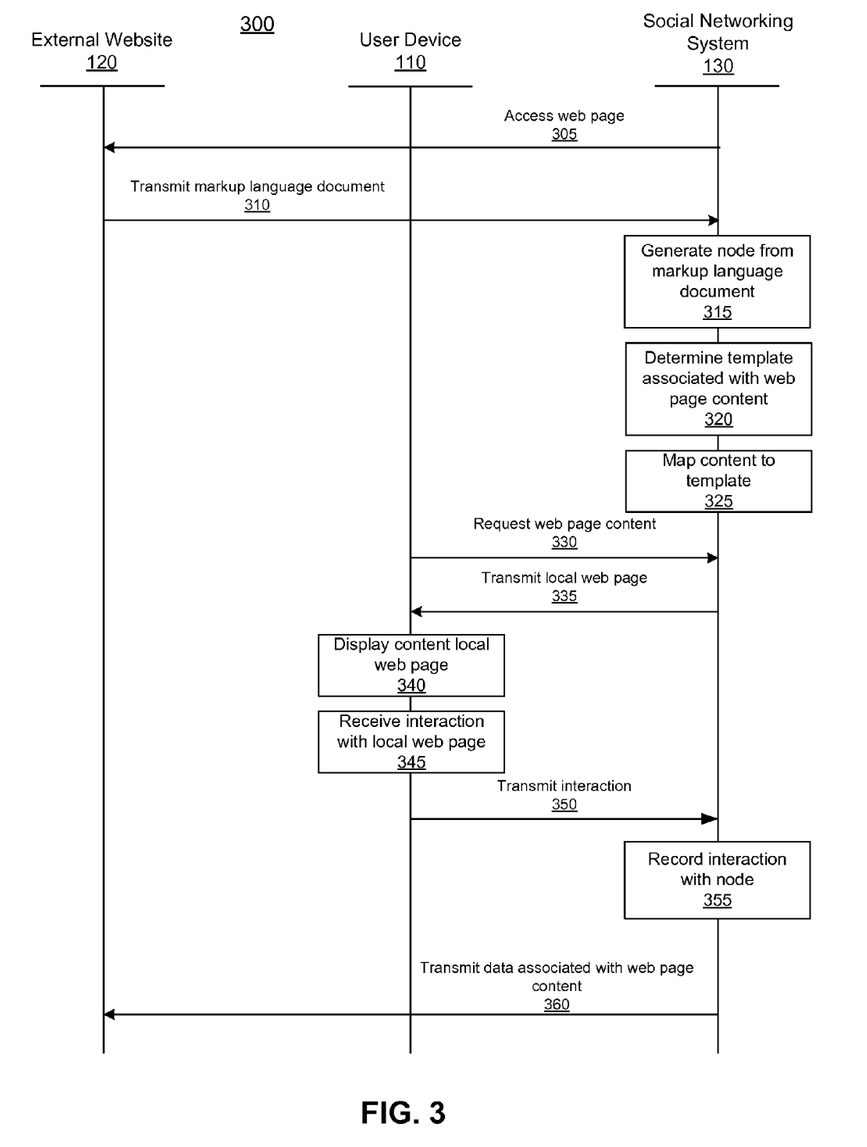
FIG. 3 is an interaction diagram of a process for using a social networking system to interact with content from a web page outside of the social networking system, in accordance with an embodiment of the invention.

FIG. 3 illustrates an interaction diagram of a process 300 for using a social networking system 130 to present with content from a web page 122 outside of the social networking system 130, in accordance with an embodiment of the invention. As mentioned above, an operator of an external website 120 has created a markup language document 116 encoding the web page 122, which is served by the external website 120. The markup language document 116 may also include one or more tags.

The social networking system 130 accesses 305 a web page 122 hosted by an external website 120, causing the markup language document 116 describing the web page 122 to be transmitted 310 from the external website 120 to the social networking system 130 via the network 140. The social networking system 130 may request the markup language document 116 in response to various types of events. For example, an operator of the web page 122 or of an external website 120 including the web page 122 may communicate a request to the social networking system 130 to generate a node associated with the web page 122. In another example, a user interface in the social networking system 130 may receive a request to generate a node associated with a web page. Alternatively, the social networking system 130 requests the markup language document 116 encoding the web page 122 upon a specific request by a user of the social networking system 130. As another example, in response to receiving a request by a user of the social networking system 130 to interact with a node associated with the URL (e.g., a request to "like" or otherwise become affiliated with a web page), the social networking system 130 may request the markup language document 116 encoding the web page 122 if it determines that a node associated with the web page 122 does not currently exist.

The social networking system 130 extracts and records information from the tags in the markup language document 116. In one embodiment, the social networking system 130 copies the markup language document 116 or a subset of the markup language document 116 to a storage device, or other memory, associated with the social networking system 130. For example, content from the web page 122 is transmitted 510 from the external website 120 to the social networking system 130 via the network 140. In one embodiment, one or more tags including meta-information associating the web page 122 represented by the markup language document 116 with a node in the social networking system 130 are also transmitted 310 to the social networking system 130.

If the social networking system 130 does not already include a node associated with the web page 122, the tags from the markup language document 116 are used to generate 315 a node associated with the web page 122. The tags may provide textual titles, labels, and/or descriptions about the new node in the social networking system 130 associated with the web page 122, as well as other information, such as a title, label, unique identifier, micro format, and/or descriptions about the node, as well as other information, such as the type of the node. The information extracted from the tags is stored in the social networking system 130. For example, the social networking system 130 generates a node having a type identified by a node type tag and store data extracted from a title tag, a keywords tag, a description tag and an administrator tag included in the markup language document.

Thus, the tags allow generation 315 of a node in the social networking system 130 based on the information within the markup language document 116 comprising a web page 122, as further described above, or allow identification of a stored node in the social networking system 130 associated with the web page 122. If the social networking system 130 includes a node associated with the web-page 122, the social networking system 130 identifies the node from the web page content or from data in one or more tags received from the user device 110. After the node is generated, the web page 122 is included in the social graph maintained by the social networking system 130, effectively opening the social graph to third-party developers and encouraging further development and definition of a complex and rich social graph.

If the markup language document 116 does not include any tags, or includes insufficient tags to provide complete information about the node, the social networking system 130 may generate a predetermined type of node and parse the markup language document 116 to identify data for storage in the generated node. In one embodiment, the social networking system 130 may obtain information from the external web page 122 about the node without requiring tags or other explicit indicators that mark up the meta-information describing the node. For example, the social networking system 130 may import RSS feed entries from the web page 122, identify users' faces from images on the web page 122, or perform any of a variety of actions for automatically gleaning information from the web page 122. This information may then be stored by the social networking system 130 and used to create local pages about the node, as described below.

Using the web page content, including any relevant tags, the social networking system 130 determines 320 a template from the template store 250 used by the browser 112 on the user device 110 to display the content from the web page 122. In one embodiment, the social networking system 130 determines an object type from one or more tags included in the markup language document 116 used to render the web page 122 and determines 320 a template associated with the object type. The social networking system 130 then maps 325 content from the web page to the determined template, so that instructions included in the determined template describe how the user device 110 displays the web page content. For example, responsive to a node type tag indicating that the web page 122 is associated with an event node, a template associated with an event node is identified by the social networking system 130 and the web page content is mapped 325 to the template to generate a local web page that is hosted by the social networking system 130. If the web page 122 is associated with multiple node type tags, the social networking system 130 may determine 320 that multiple templates may be used to display the web page content. For example, if a web page 122 includes data describing an event and a group, the social networking system 130 may determine that a template associated with an event node or a template associated with a group node may be used to display the web page content, and maps 325 the web page content to both a template associated with an event node and to a template associated with a group node, producing a local event web page and a local group web page.

Once the social networking system 130 stores a node associated with a web page 122, a user of the social networking system 130 may interact with the node by interacting with the web page 122. Accordingly, the user device 110 requests 330 the web page content, causing the social networking system 130 to transmit 335 the template and the web page content to the user device 110 via the network 140. The user device 110 may request 330 a page about the node from the social networking system 130, which may host pages for various types of nodes. The social networking system 130 transmits 335 the local web page generated by mapping the web page content to the template to the user device 110 via the network 140, and the user device 110 displays 340 the local web page, including the web page content, based on instructions included in the local web page.

In one embodiment, the local web page also includes instructions for capturing user interactions and communicating the captured user interactions to the node associated with the web page 122. For example, the local web page includes instructions causing the user device 110 to display 340 one or more action buttons, or other user interface elements, allowing a user to interact with the node associated with the web page 122. When an action button or other user interface element displayed 340 by the user device receives 345 an interaction, a description of the interaction is transmitted 350 from the user device 110 to the social networking system 130, which records 355 the interaction with the node in the action log 230. For example, a local web page associated with an event may display 340 an action button allowing a user to confirm attendance at the event. When a user accesses this action button, a user identifier and a confirmation is transmitted 350 to the social networking system 130 to indicate that the user is attending the event. In one embodiment, the social networking system 130 may transmit 360 data associated with the web page content back to the external website 120 to provide information about how social network users interact with the web page content. For example, the social networking system 130 may transmit data describing how many users interacted with web page content and/or a description of the types of interactions between social network users and web page content.

Accordingly, the social graph maintained by the social networking system 130 may include anything that can be represented by a web page, and the social networking system 130 may facilitate interaction with content presented by a web page. In addition to increasing the amount of data stored by the social graph, this allows the social networking system 130 to simplify interaction with content from a domain associated with the social networking system 130. For example, the social networking system 130 may format content from an external website 122 to simplify user interaction with the content and allow more types of user interactions with web page content. Additionally, interactions between users and nodes representing web pages may be propagated back to the social networking system 130, which may then use socially relevant data from the interaction for various purposes (e.g., posting activity feeds, targeting advertising, etc.).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    accessing information from a web page about an object, the web page provided in a domain that is different from a domain associated with social networking system;
    defining a node in the social networking system at least in part according to the accessed information, the node comprising a representation of the object in the social networking system;
    generating a local page of content within the social networking system, the local page comprising information accessed from the web page about the object and one or more options for enabling one or more users of the social networking system to perform an action related to the node;
    receiving requests from one or more users of the social networking system using the local page to perform the action related to the node; and storing information related to one or more users' interactions with the node by the social networking system.

2. The method of claim 1, further comprising:
communicating information related to one or more users' interactions with the node to the domain that is different from the domain associated with the social networking system.

3. The method of claim 1, wherein generating the local page of content within the social networking system comprises:
selecting a template in the social network system based on information from the web page, the template including instructions describing display of content from the web page using the domain associated with the social networking system; and
mapping information from the web page to the selected template.

4. The method of claim 1, wherein accessing the information from the web page comprises:
obtaining a markup language document for the web page; and
identifying one or more tags in the markup language document, the tags containing the accessed information.

5. The method of claim 4, wherein the one or more tags comprise at least one information item selected from a group consisting of: a type of the node, a name of the node, a textual description associated with the node, location information associated with the node, and a unique identifier for the node, an identity of one or more users of the social networking system designated as an administrator of the node.

6. The method of claim 4, wherein identifying the template in the social network system by analyzing information from the web page comprises:
determining a type of the node from one or more tags in the markup language document; and
determining a template associated with the type of the node.

7. The method of claim 1, wherein the accessed information comprises a definition of a type of the node, and wherein the method further comprises limiting the one or more actions that a user can perform related to the node based on the type of the node.

8. The method of claim 7, wherein identifying the template in the social network system by analyzing information from the web page comprises:
identifying a template associated with the definition of the type of the node, the template limiting enabled actions to actions associated with the definition of the type of the node.

9. The method of claim 1, further comprising:
updating a profile of a user who has performed an action related to the node to reflect that the user has performed the action.

10. The method of claim 1, further comprising:
updating stored information about the node to reflect that a user has performed an action related to the node.

11. The method of claim 1, wherein the node in the social networking system represents a page of content in the social networking system.

12. The method of claim 11, wherein the action comprises a user's expressing an interest in the page.

13. The method of claim 12, further comprising:
response to a user's expressing an interest in the page associated with the node, updating a profile of the user with the expressed interest.

14. The method of claim 1, wherein the node in the social networking system represents an event.

15. The method of claim 14, wherein the action comprises a user's confirming attendance at the event.

16. The method of claim 1, wherein the node in the social networking system represents a location.

17. The method of claim 16, wherein the action comprises a user's confirming the user's presence at the location.

18. The method of claim 1, wherein identifying a template in the social network system by analyzing information from the web page comprises:
receiving from a user device a request to display content from the web page using the domain associated with the social networking system; and
analyzing information from the web page to identify the template including instructions describing display of content from the web page using the domain associated with the social networking system.

19. A method comprising:
accessing a web page from a web server, wherein the web page is within a domain different from a domain of a social networking system;
receiving a markup language document for the requested web page, the markup language document including web page content and a definition of a type of a node associated with the web page content, the web page content comprising information about an object;
defining a node in the social networking system at least in part according to the web page content, the node comprising a representation of the object in the social networking system;
determining a template from the social networking system based on the type of the node associated with the web page, the template including instructions describing display of content from the web page;
generating a second web page within the domain of the social networking system by combining the web page content and the instructions describing display of content from the web page from the template;
displaying the second web page on a user device, wherein the second web page enables a user to interact with a node in the social networking system associated with the web page; and
responsive to detecting a user interaction with the node using the second web page, communicating the interaction to the social networking system, the social networking system configured to store the interaction.

20. The method of claim 19, wherein the template limits user interaction with the node in the social networking system to interactions associated with the definition of the type of the node.

21. The method of claim 19, wherein the markup language document includes a definition of a second type of node associated with the web page and the second web page includes the web page content combined with instructions describing display of content from the web page from a second template associated with the second type of node.

22. The method of claim 21, wherein the second web page includes an action button for performing an action related to the node directly within the domain of the social networking system.

23. The method of claim 19, further comprising:
communicating information related to the user interaction with the node to web server.

24. A method for providing content, the method comprising:
generating a plurality of templates, each template associated with a type of a node and including instructions for displaying content;

receiving a markup language document for a requested web page within a domain different from a domain of a social networking system, the markup language document including web page content and a definition of a type of a node associated with the web page content, the web page content comprising information about an object;

defining a node in the social networking system at least in part according to the web page content, the node comprising a representation of the object in the social networking system;

identifying a template associated with the web page using the definition of the type of node included in the markup language document;

determining a template from the social networking system based on the type of the node associated with the web page, the template including instructions describing display of content from the web page;

providing a local page in a domain of the social networking system for enabling one or more users of the social networking system to perform an action related to the node associated with the web page content by interacting with an element identified by the template;

receiving requests from one or more users of the social networking system to perform an action related to the node associated with the web page content from the element identified by the template, the requests received using the local page; and storing information related to one or more users' interactions with the node associated with the web page content by the social networking system.

25. The method of claim 24, wherein the action related to the node is determined by the definition of the type of the node.

26. The method of claim 24, wherein the element identified by the template is determined by the definition of the type of the node associated with the web page content.

27. The method of claim 24, further comprising:
communicating information related to one or more users' interactions with the node to the domain that is different from the domain associated with the social networking system.

28. The method of claim 24, determining a template from the social networking system based on the type of the node associated with the web page comprises:
identifying one or more tags in the markup language document, the tags containing data describing the content of the web page;
determining a type of the node from one or more tags in the markup language document; and
determining the template associated with the type of the node.

29. The method of claim 28, wherein the one or more tags comprise at least one information item selected from a group consisting of: a type of the node, a name of the node, a textual description associated with the node, location information associated with the node, and a unique identifier for the node, an identity of one or more users of the social networking system designated as an administrator of the node.

* * * * *